United States Patent [19]

Schiel

[11] Patent Number: 4,770,094

[45] Date of Patent: Sep. 13, 1988

[54] CONTROL VALVE FOR REGULATING A PRESSURE RATIO BETWEEN TWO PRESSURE SYSTEMS

[75] Inventor: Christian Schiel, Heidenheim, Fed. Rep. of Germany

[73] Assignee: J. M. Voith GmbH, Fed. Rep. of Germany; 44

[21] Appl. No.: 14,044

[22] PCT Filed: Jun. 13, 1986

[86] PCT No.: PCT/EP86/00352

§ 371 Date: Feb. 12, 1987

§ 102(e) Date: Feb. 12, 1987

[87] PCT Pub. No.: WO86/07475

PCT Pub. Date: Dec. 18, 1986

[30] Foreign Application Priority Data

Jun. 15, 1985 [DE]  Fed. Rep. of Germany ....... 3521579

[51] Int. Cl.$^4$ .............................................. B30B 15/16
[52] U.S. Cl. .................................. 100/163 A; 100/47; 100/53; 100/117; 100/170; 137/87; 137/115; 137/117
[58] Field of Search .............. 29/116 AD; 100/162 B, 100/170, 50, 47, 53, 163 A, 160; 137/87, 115, 117; 72/243; 162/271, 361

[56] References Cited

U.S. PATENT DOCUMENTS

| | | | |
|---|---|---|---|
| 4,106,405 | 8/1978 | Biondetti et al. | 100/170 X |
| 4,303,091 | 12/1981 | Hertell et al. | 137/117 |
| 4,355,655 | 10/1982 | Hertell et al. | 137/117 |
| 4,530,371 | 7/1985 | Arav . | |
| 4,583,567 | 4/1986 | Arav | 137/87 X |
| 4,597,326 | 7/1986 | Tapani | 29/116 AD X |

FOREIGN PATENT DOCUMENTS

| | | |
|---|---|---|
| 0112625 | 7/1984 | European Pat. Off. . |
| 0112624 | 7/1984 | European Pat. Off. . |
| 532589 | 8/1931 | Fed. Rep. of Germany . |
| 3328779 | 2/1985 | Fed. Rep. of Germany . |
| 1027361 | 5/1953 | France . |

*Primary Examiner*—Andrew M. Falik
*Attorney, Agent, or Firm*—Ostrolenk, Faber, Gerb & Soffen

[57] ABSTRACT

A control valve for regulating and maintaining the pressure ratio between two pressures ($p_1$ and $p_2$) associated, respectively, with two separate pressure systems at a constant value. In particular, the pressure ($p_2$), prevailing in hydraulic cylinders which serve to press one press roll against a counter roll in a roll press, is controlled as a function of the pressure ($p_1$) of the fluid which transfers the contact pressure in a deflection adjusting roll of the roll press. The control valve includes a piston, movably disposed in the housing of the control valve, and provided with a first end face area (A1) at one end thereof and a second end face area (A2) at the opposite end thereof. The end face area (A1) is subjected to the first pressure ($p_1$) in a first pressure chamber (1a) and the second end face area (A2) is subjected to the second pressure ($p_2$) in a second pressure chamber (2a). The piston and the housing form between themselves a first overflow gap (S2) which connects the second pressure chamber (2a) to a low-pressure chamber (4a), enabling fluid to flow controllably from the second pressure chamber at a rate which maintains the desired pressure ratio. The piston and the housing define an additional overflow gap (S1) which connects the first pressure chamber (1a) to another low-pressure chamber (3a). Whenever the second pressure ($p_2$) falls below a given pressure value, the additional overflow gap (S1) opens and the first pressure ($p_1$) drops so as to maintain the desired pressure ratio.

19 Claims, 4 Drawing Sheets

CONTROL VALVE FOR REGULATING A PRESSURE RATIO BETWEEN TWO PRESSURE SYSTEMS

BACKGROUND OF THE INVENTION

The present invention relates to a control valve for regulating a pressure ratio between the pressures $p_1$ and $p_2$ in two separate pressure systems.

Control valves of the type referred to herein are known from DIN Standard Sheet 24300 dated March 1966, Sheet 3. Page 7, No. 3.2. which describes what is entitled a proportioning pressure relief valve. The control valve serves to maintain a particular pressure ratio value b between two pressures $p_1$ and $p_2$.

Separate pressure systems whose pressures are interdependent are found, e.g. in roll presses of paper machines, especially in wet presses (which extract water from the paper web) and/or in smoothers (which smooth the paper web). In these types of roll presses, at least one of the rolls can be a deflection adjusting roll, e.g. what is known as a floating roll. In such cases, there is a problem in regulating and obtaining desired pressures in two separate pressure systems. One pressure system relates to the effective pressure acting on the pistons of the outer hydraulic cylinder pressing the one roll against the other roll. The other pressure concerns the internal pressure in at least one pressure chamber located in the adjustable deflection roll between the rotating roll shell and the stationary "yoke" passing through the shell. Another possible configuration may involve two counteracting internal pressures of two deflection adjusting rolls whose roll shells are pressed together.

In these types of roll presses comprising two separate pressure systems, the problem is to maintain the ratio between the two pressures $p_1$ and $p_2$ constant with a high degree of certainty. In particular, in the event of a defect, for example the sudden failure in the supply of control air, a hydraulic pump failure or a line break, the desired ratio between the two pressures $p_1$ and $p_2$ must be restored with the minimum possible time delay. In other words, should one of the two pressures change during a dynamic process, the other pressure should also change immediately to maintain the desired ratio at all times. If this is not attained, there is risk of damaging to the rolls or the felt which runs through the roll press together with a paper web. Or the damage may be to the treated paper web itself. Damage of this nature has frequently occurred in the past because it was not possible to maintain the desired pressure ratio with sufficient accuracy in the dynamic operating conditions of the roll press.

Conventional systems use electrically or pneumatically piloted hydraulic valves to produce a reference pressure in the hydraulic pressure chambers. Even if the regulating valves were to operate without delay in response to dynamic changes in the operating conditions, i.e. to increase or decreases in operating pressures, near instantaneous change in the pressures in the various pressure chambers can not be expected because the machine parts are subjected to elastic deformation and specific quantities of oil need to be pumped through the regulating valves before the deformations are produced. For design reasons, it is impossible to always ensure the same time constants for filling or evacuating the hydraulic working volumes resulting from a deformation in both hydraulic systems during loading and relief operations in this type of conventional control model.

This is evident from examining the hydraulic deflection adjusting roll depicted in FIG. 1 of the German laid-open patent application OS No. 33 28 779, taking standard dimensions as a basis. In the event of a pressure change, e.g. by pressing the two rolls together and increasing the pressure from zero to maximum pressure, on the one hand, the side frames not depicted in the Figure are deformed by 2 mm; on the other hand, the yoke 11 of the roll deflects by 30 mm at its center. The pump for the outer hydraulics producing the pressure in the pressure chambers 32 and 33 of the outer contact pressure hydraulics has a flow volume of 40 liters/min. The pistons have 300 mm diameters. Disregarding leakage and throttle losses, the time to attain full pressure in the outer system is calculated to be 0.42 sec. On the other hand, the displacement volumes during yoke deflection is 140 liters and the delivery output of the pump is 90 liters/min. Hence the time to attain full pressure in the inner system can be calculated to be 93 sec, i.e. more than 200 times greater than in the outer system! It is undesirable to make the outer contact pressure system as sluggish as the inner one because it must be possible to open the press quickly, e.g. in the event of disturbances. Moreover, pressure- and oil-temperature-dependent leakage losses occur in the inner system, depending on the length of time in service (running in of seals). Thus, with conventional means, it is impossible to obtain the sought after simultaneous, constantly precise pressure change in the two pressure systems.

European patent application No. 0 112 625 demonstrates a valve configuration for a system referred to herein. The configuration includes a pneumatically controlled valve piston to control the pressure $p_1$ in a first hydraulic system, and a control valve in the form of a floating piston to control the pressure $p_2$ in a second hydraulic system. The pressure $p_2$ is correlated to the pressure $p_1$ in a first hydraulic system. Under stationary operating conditions, the control valve is capable of producing a control characteristic between the two pressures according to the equation $p_2 = b \cdot p_1$. However, it is impossible with that valve to correlate more than two pressures, as is occasionally desired. A more serious situation is that, in the event of failure, the desired pressure ratio $p_2/p_1$ can not be maintained with the known valve. Hence, according to another European patent application No. 0 109 220, a further safety valve is provided between the two hydraulic systems having $p_1$ and $p_2$. The latter valve has the property that, should the pressure in one of the two systems be greater by a specific amount than corresponds to the control characteristic, a valve opens and relieves the overpressure. However, since spring force must be overcome to open the valve and since frictional losses occur in the lines and in valve bodies, the device is also incapable of achieving a precise control behavior.

An object of the present invention is to solve the problem of providing a control valve for regulating a specific ratio between the pressures of two separate pressure systems. The valve should maintain a desired pressure ratio between two pressure systems with greater accuracy than previously known, both under stationary and dynamic operating conditions. Simultaneously, the pressure systems should have the simplest possible configuration in order to lower manufacturing costs and avoid errors when adjusting the machines.

Finally, it shall be possible as required to alter the ratio between the two pressures in the simplest manner.

According to the present invention the piston and the housing of the control valve form a total of two overflow gaps. The parts are spatially separated in such a manner that the fluids of the two pressure systems remain completely separated from each other. As required, the low-pressure chambers, into which the pressurized fluid flows after passing the overflow gaps, may also be separated from each other. However, since the same pressurized fluid is frequently used in the two pressure systems, and since the two low-pressure chambers are frequenctly subjected to the same pressure, e.g. atmospheric pressure, only one low-pressure chamber common to the two overflow gaps may be provided.

In the control valve according to the invention, the two piston end faces subjected to the pressures of the two pressure systems can be of equal size as required if the ratio between the two pressures must be constantly equal to 1. However, as a rule, the pressure ratio deviates from 1 and therefore the end faces have unequal sizes.

All the embodiments of the control valve according to the invention have the following objective. Whereas regulation of the second pressure $p_2$ occurs at one overflow gap during the normal state of equilibrium by a continuous flow of a small quantity of fluid from the second pressure chamber into the low-pressure chamber as in control valves of the art, in the additional overflow gap provided according to the invention there is no regulation process; i.e. the piston maintains the additional overflow gap generally closed. A pressure regulation process only occurs at the additional overflow gap if the second pressure $p_2$, (e.g. in the event of any disturbance) undershoots the desired value. In this case, provision is also made for the first pressure $p_1$ to decrease simultaneously with the second pressure $p_2$, thus maintaining constant the desired pressure ratio. The inventor perceived that the omission of the additional function in control valves of the art was the cause of the previously described difficulties.

Another objective is that the control valve according to the invention take into account not only the pressure $p_1$ prevailing, for example, in the pressure chamber of the deflection adjusting roll, but also a counterpressure, for example, the variable counterpressure $p_3$ (changing with oil viscosity and gravity conditions) acing on the other side of the yoke of the deflection adjusting roll.

Another objective is that the pressure difference $p_1 - p_3$ follow an exactly linear progression to pressure $p_2$.

In the case of a control valve according to the invention, the additional force F5 can contribute towards the fact that, for example, the net weight of a vertically pressing roll can be taken into consideration during the pressure regulation process. Thus, the control valve is not only capable of generating a control characteristic according to the equation $p_2 = b \cdot p_1$, but can also generate a control characteristic according to the equation $p_2 = a + b \cdot p_1$, where the differential value a is determined by the additional force F5. If, as mentioned above, the counterpressure $p_3$ must also be taken into consideration, the equation for the control characteristic will be $p_2 = a + b \cdot (p_1 - p_3)$.

In principle, at least one of the control edges of the pistons, as is known, could be formed by a circumferential slot machined into the surface of the piston skirt. However, the known configuration will be preferred since it is simpler and space-saving and it offers the possibility of altering as required the value b of the control characteristic by using simple means, which are described herein.

With the guide bushing mentioned herein, the objective is achieved that the piston can be displaced in the housing with almost complete freedom of resistance. This largely allows the control valve to operate with the desired accuracy.

In accordance with another objective, a further counterpressure acting against the second pressure $p_2$ is taken into consideration, the equation thus becoming: $p_2 - p_4 = a + b \cdot (p_1 - p_3)$. Means are provided for the control process to remain unaffected in the event of changes in the counterpressure $p_4$.

Certain features presented herein are especially recommended for those parts of the control valve forming the additional overflow gap according to the invention. Since fluid actually flows through the additional overflow gap during relatively seldom occasions, there is the danger that a contaminating particle may lodge itself between the piston and the housing bore, thus causing friction. The taper provided firstly allows the constant flow of a very small quantity of fluid through the additional overflow gap (without the occurrence of a regulation process there), thus removing any contaminating particle present, and secondly a sufficiently high flow resistance is present in order to allow the draining away of a low quantity of fluid.

SUMMARY OF THE INVENTION

To summarize, according to the main aspect of the present invention, under normal operating conditions, the second pressure $p_2$ is regulated with the aid of the conventional overflow gap which maintains a desired pressure ratio between two pressure systems by permitting a continuous flow of a small quantity of fluid from the second pressure chamber into a low-pressure chamber. In addition, however, the invention provides a further overflow gap which is normally kept closed. However, if at any time the second pressure $p_2$ undershoots its desired value (e.g. in the event of any disturbance) this further overflow gap is opened to enable the first pressure $p_1$ to decrease simultaneously with the second pressure $p_2$ to, in this manner, maintain the desired pressure ratio at its intended value.

Embodiments of the invention will be explained below by reference to the drawings.

DETAILED DESCRIPTION OF THE PREFERRED EMBODIMENTS

Figure 1:
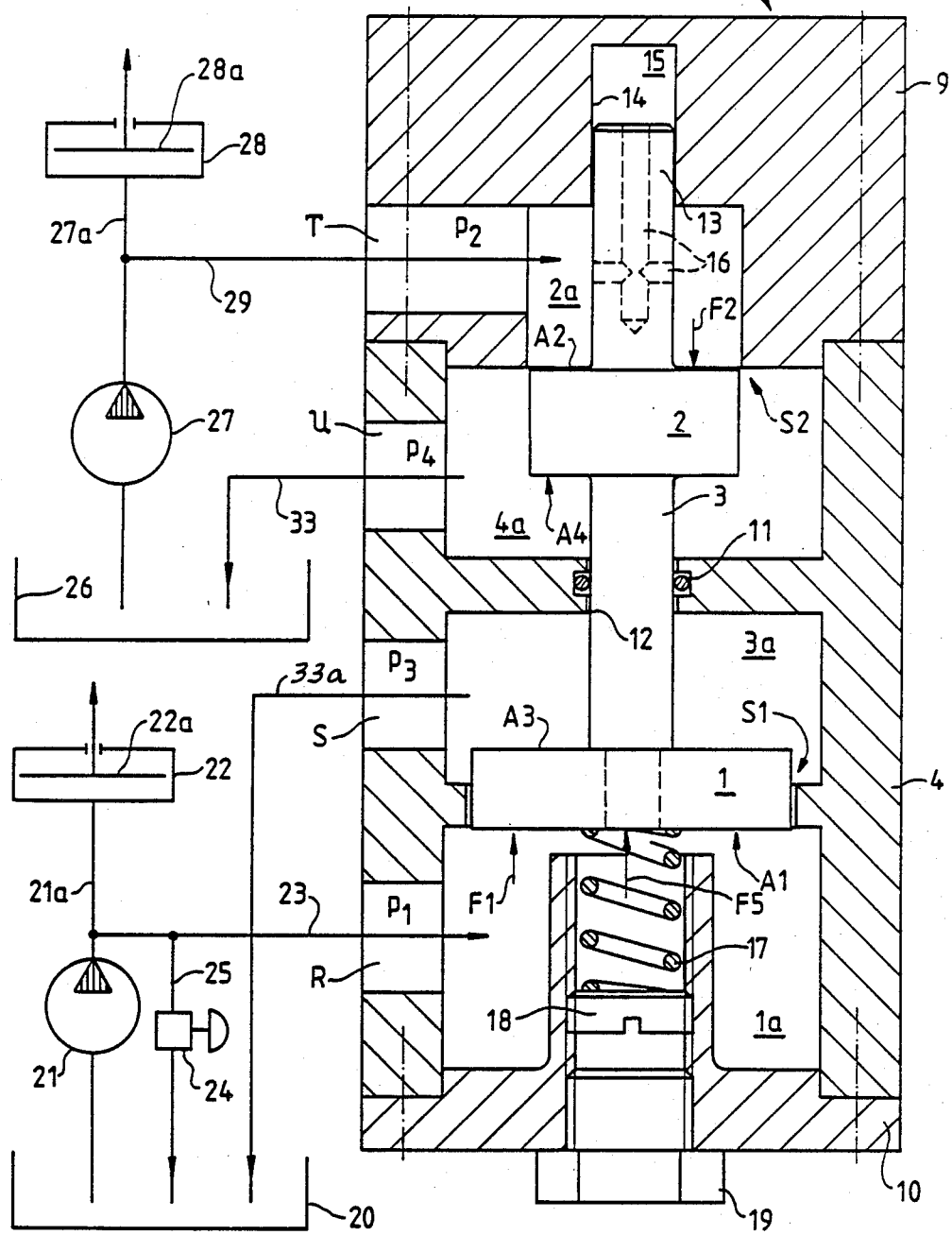
FIG. 1 is a longitudinal section through a first embodiment of the control valve according to the invention.

The control valve 50 depicted in FIG. 1 has a lower piston 1 and an upper piston 2 connected by a piston rod 3. The control valve 50 is disposed in a housing 4 having an upper cover 9 and a lower cover 10. The underside of the lower piston 1 has an effective end face area A1 which is subjected to a pressure $p_1$ prevailing in a first pressure chamber 1a. The upper side of the lower piston 1 has a counterpressure area A3 which is subjected to a pressure $p_3$ prevailing in a fourth low-pressure chamber 3a, the pressure $p_3$ being generally lower than $p_1$. If $p_3$ is equal to atmospheric pressure, the chamber 3a is connected to the oil reservoir 20 via the orifice S and the line 33a. A housing partition 12 a sealing ring 11 seal the low-pressure chamber 3a from a further third low-pressure chamber 4a. In chamber 4a prevails a pressure $p_4$ which acts on the counterpressure area A4 of the upper piston 2. The chamber 4a can also be connected to an oil reservoir 26 via the orifice U and the line 33. The piston rod 3 is mounted at one end in the partition 12 and at the other end by the trunnion 13 in the housing bore 14. The trunnion 13 is an extension of the piston rod 3. The trunnion 13 is provided with connecting bores 16 extending between a second pressure chamber 2a and the chamber 15. Thus, chamber 15 is in communication with chamber 2a. A helical spring 17 produces an additional force F5 which acts on the piston 1. The force of the spring is adjustable by turning the threaded plug 18 whose threaded bore in the cover 10 is closed by means of a plug 19.

A pump 21 supplies oil from an oil reservoir 20 via a pressure line 21a to a hydraulic contact pressure element 22 having a piston 22a. A connecting line 23 runs from the pressure line 21a via the orifice R to the pressure chamber 1a. A pressure relief valve 24 in an overflow line 25 maintains the pressure $p_1$ in the pressure chamber 1a. The pump 27 supplies oil from an oil reservoir 26 via a pressure line 27a to a hydraulic contact pressure element 28 having a piston 28a The oil at pressure $p_2$, which is normally greater than $p_1$, passes through the branch line 29 via the orifice T to the chamber 2a above the piston 2, whose effective end face area A2 is smaller than A1. The pressure $p_2$ presses the entire piston 1, 2, 3 downwards until oil just begins to escape through the gap S2. Thus, the pressure $p_2$ in the chamber 2a is maintained at such a value as to maintain the forces F1+F5 acting on the lower piston 1 and F2 acting on the upper piston 2 in equilibrium.

Figure 2:
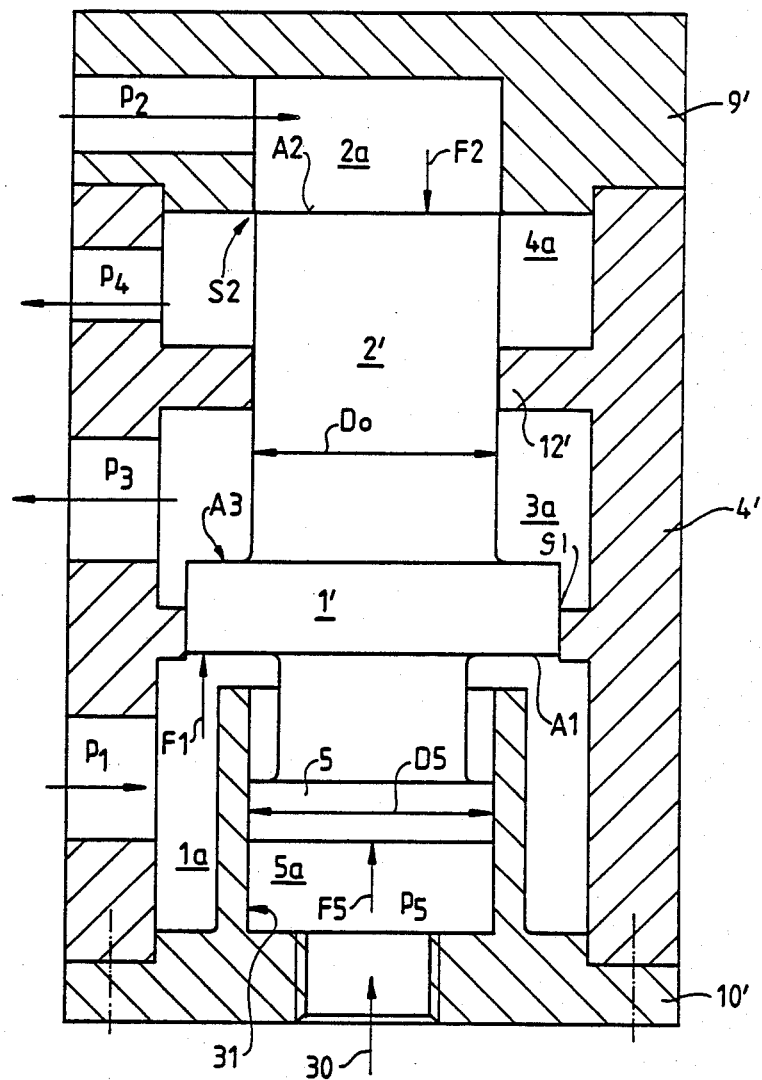
FIG. 2 is a longitudinal section through a variant to the embodiment according to FIG. 1.

In FIG. 2 the housing parts corresponding to the parts 4, 9, and 10 in FIG. 1 are marked 4', 9', 10'. Here the additional force F5 is produced hydraulically instead of with a spring. Fluid at pressure $p_5$ is fed via a line 30 into a fifth chamber 5a and acts on the piston part 5 sliding in the bore 31 and forming an extension of the piston part 1'. The additional force F5 can be adjusted to the desired value by changing the pressure $p_5$. The upper piston part 2' sliding in the partition 12' has the same diameter D0 along its entire length. Thus, there is no upper counterpressure area (such as A4 in FIG. 1). The diameter D5 of the piston part 5 is equal to the diameter D0 of the piston part 2'. Thus, the effective end face area A1 of the piston part 1' is equal to the counterpressure area A3.

Figure 3:
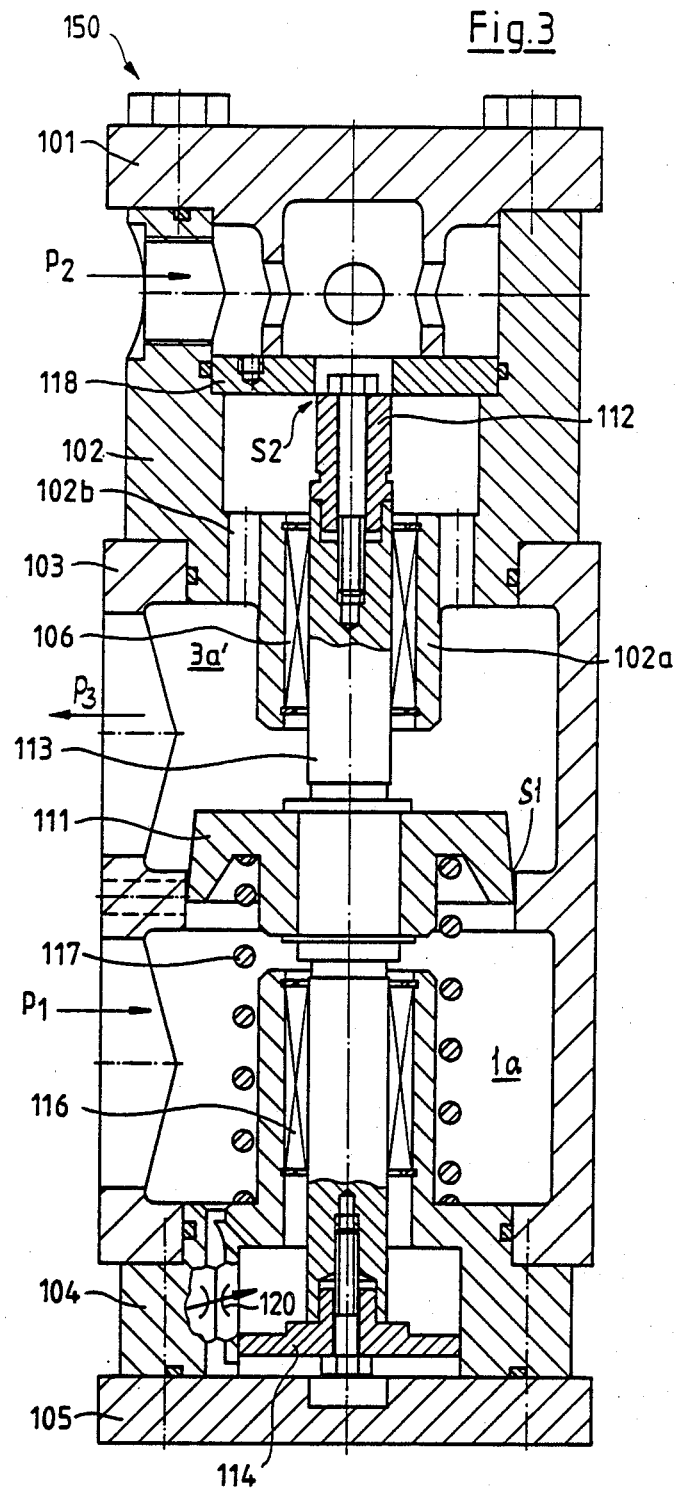
FIG. 3 illustrates further embodiment of the control valve according to the invention.

The control valve generally designated by reference numeral 150 in FIG. 3 is basically composed of 5 housing parts marked (from top to bottom) 101, 102, 103, 104 and 105. The two upper housing parts 101 and 102 are in turn supplied with the second pressure $p_2$. An upper, smaller piston 112 subjected to the second pressure $p_2$ is attached to a piston rod 113 as are a middle relatively large piston 111 which is subjected to the first pressure $p_1$ which acts from below, and, at the bottom end, a damping piston 114 which is subjected to the first pressure $p_1$. The latter damping piston 114 is thus not involved in pressure regulation operations. It merely dampens the movements of the entire piston system to prevent oscillations.

The housing part 102 forms a partition 102a in which is disposed a ball guide bushing 106 acting as a frictionless bearing for the piston rod 113. Several bores 102b run through the partition 102a and thus the inner chambers of the housing parts 102 and 103 form a single low-pressure chamber 3a' in which a uniform low pressure $p_3$ prevails. A second ball guide bushing 116 to guide the lower part of the piston rod 113 is disposed in the housing part 104. The housing part is provided with connecting bores to supply the pressure $p_1$ to both end faces of the damping piston 114. The diagrammatically depicted adjustable throttle 120 serves to adjust the damping effect.

The middle piston 111, whose lower end face is subjected to the first pressure $p_1$ and to the force of a spring 117, is tapered towards the top with a taper ratio of between 1:200 and 1:500.

A replaceable washer 118 is arranged between the upper housing parts 101 and 102. The washer was a central bore whose diameter corresponds to the diameter of the upper piston 112. The control edges of the two components 112 and 118 form the overflow gap S2, maintaining the second pressure $p_2$ at the desired value. If it is necessary to change the value b of the aforementioned control characteristic, the uppermost housing part 101 need only be removed and the washer 118 and the piston 112 replaced by suitable components with different bore and piston diameters.

In the embodiments of FIGS. 1–3 the additional overflow gap (S1) connects the first pressure chamber (1a) to the low pressure chamber (3a or 3a'), whenever the second pressure (P2) falls below a predetermined pressure value.

Figure 4:
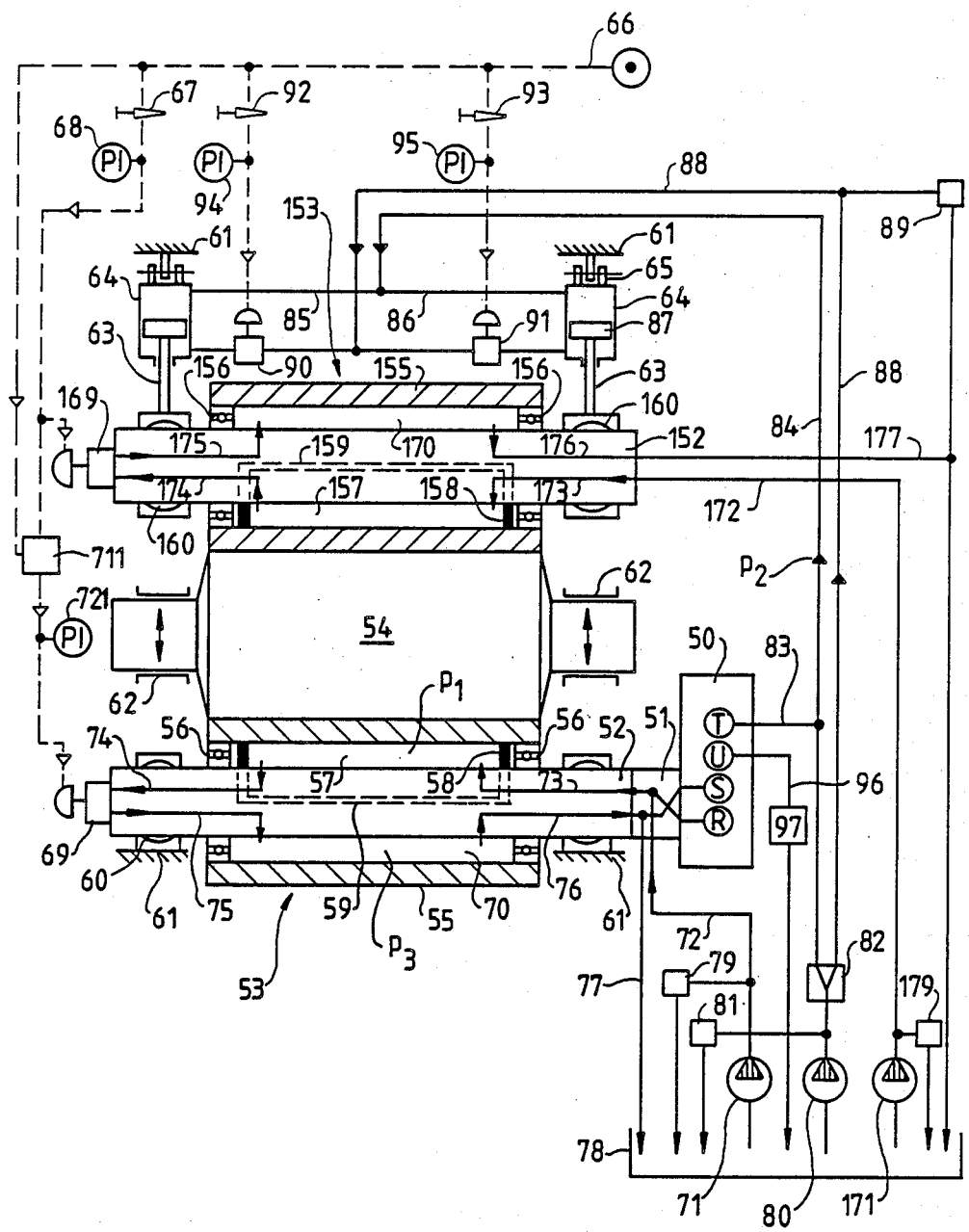
FIG. 4 shows an application example of the control valve according to the invention. It involves a three-roll press and illustrates diammatically two separate pressure systems.

FIG. 4 depicts a three-roll calendar of a paper machine to which the control valve 50 according to FIG. 1 having its connecting orifices (R), (S), (T) and (U) is applicable. The valve 50 is connected by an adapter 51 to the yoke 52 of a floating roll 53. On the floating roll 53 lies a rigid roll 54 and on the roll 54 lies another floating roll 153 and the yoke 152. The floating rolls 53 and 153 have cylindrical roll shells 55, 155, pivoted by roller bearings 56, 156 on the yokes 52, 152. The pressure chambers 57, 157 are closed by end face seals 58, 158 ad longitudinal seals 59, 159 between the yokes 52, 152 and the roll shells 55, 155. The floating roll 53 is connected by spherical bearing bushes 60 to the frame 61. The intermediate rigid roll 54 runs in longitudinally displaceable journal bearings 62. The yoke 152 of the upper floating roll 153 is directly connected by spherical bearing bushes 160 or by an intermediate bearing levers (not shown) to the piston rods 63 of the two hydraulic cylinders 64. The cylinders 64 are also supported on the frames 61 by joints 65.

A compressed air line 66 supplies control air to a pressure regulator 67. The output pressure set at the pressure regulator is indicated by the pressure gauge 68 and adjusts the desired hydraulic differential pressure between the pressure chamber 157 and the leakage chamber 170 at the differential pressure regulating valve 169.

An addition valve 711 increments the amount given by the pressure regulator 67 by an additive constant. The output pressure of the addition valve can be read on a pressure gauge 721. With said pressure the desired hydraulic differential pressure $p_1-p_3$ between the pressure chamber 57 and the leakage chamber 70 in the lower floating roll 53 is controlled by means of the differential pressure regulating valve 69.

The pneumatically controlled hydraulic differential pressure valves 69 and 169 are described in the floating rolls literature.

A prerequisite for the hydraulic pressures in the floating rolls 53 and 153 is the operation of the hydraulic pumps 71 and 171 which pump oil over the lines 72, 73 and 172, 173 into the pressure chambers 57 and 157 of the rolls 53 and 153. The quantities of oil pumped into the pressure chambers 57, 157 pass through the rolls and flow through the lines 74, 174, through the differential pressure regulating valves 69, 169 and through the lines 75, 175 into the leakage chambers 70, 170 and from there through the lines 76, 176 and 77, 177 back to the oil reservoir 78. The pressure relief valves 79, 179 are mere safety devices and are closed in normal operation.

A further pump 80 and a pressure relief valve 81 provide for the flow of pressurized oil via a flow distributor 82 and the lines 84, 88 to the hydraulic cylinders 64. A branch line 83 connected to the line 84 runs to the housing orifice (T) of the control valve 50 which adjusts the pressure $p_2$ in the lines 83, 84. The pressure $p_2$ acts through the lines 85 and 86 on the pressure chambers above the pistons 87 of the cylinders 64.

Part of the oil delivered by the pump 80 flows through the line 88, protected by the pressure relief valve 89, to the pneumatically piloted pressure regulating valves 90, 91 and acts over said components on the undersides of the pistons 87 of the cylinders 64. The pressure regulating valves 90, 91 are piloted via the pneumatic pressure regulators 92, 93. The control pressures can be read on the pressure gauges 94, 95.

A pressure relief valve 97 can be fitted in the return line 96 of the housing orifice (U) of the control valve 50 to adjust a desired pressure $p_4$ in the control valve 50 if the pressure is required to produce an additional force F5 (instead of a spring).

The circuit diagram depicted shows the great simplicity of the control system according to the invention.

The line force between the upper roll 153 and the intermediate roll 54 is adjusted by means of the pressure regulating valve 67. The pressure booster or addition 711 automatically provides for an increase in the pressure $p_1$ in the pressure chamber 57 of the lower roll 53 in relation to the pressure in the pressure chamber 157 of the upper roll 153. The difference corresponds to the effect of the net weight of the intermediate roll 54 together with any additional loads. The undersides of the pistons 87 are subjected to a specific supply pressure; at the line force "zero" between the rolls 54 and 153, a counterpressure acting on the tops of the pistons 87 corresponds to that pressure. The size of the counterpressure is determined in the control valve 50 by adjusting a specific additional force F5. Any desired line force can now be adjusted by operating the pressure regulating valve 67. The control valve 50 thus always provides for the corresponding ratio between the roll inner pressures and the outer contact pressures in the cylinders 64. By operating the pressure regulating valves 92, 93 the external contact pressures can be changed and corrected up or down either unilaterally or bilaterally.

I claim:

1. A control valve for maintaining a pressure ratio of a first pressure system having a pressure ($p_1$) to a second pressure system having a second pressure ($p_2$) at a constant predetermined ratio value, the control valve including:
    a control valve housing defining a first chamber for holding fluid at the first pressure ($p_1$), a second chamber for holding fluid at the second pressure ($p_2$), a third, low-pressure, chamber having an ambient pressure which is lower than the second pressure ($p_2$), and a fourth, low-pressure, chamber;
    a piston movable in the housing and having a first end face area (A1) which is exposed to the first pressure in the first chamber and a second end face area (A2) which is exposed to the second pressure in the second pressure chamber;
    an overflow gap extending between the second chamber and the third, low-pressure, chamber, the overflow gap having a fluid passage size which is controlled by the position of the piston relative to the housing such that fluid flows from the second chamber to the third, low-pressure, chamber at a rate which maintains the pressure ratio at the predetermined ratio value; and
    an additional overflow gap between the first chamber and the fourth, low-pressure, chamber, the additional overflow gap being effective to connect the first pressure chamber to the fourth, low-pressure, chamber whenever the second pressure falls below a predetermined pressure value.

2. A control valve as in claim 1, wherein the piston further comprises a counterpressure area (A3) which is subjected to a counteracting pressure which conteracts the first pressure ($p_1$), the counteracting pressure prevailing in the fourth, low-pressure, chamber.

3. A control valve as in claim 2, in which the piston includes an additional piston portion, the housing defines a housing bore having a predetermined diameter, the additional piston portion being disposed in the housing bore.

4. A control valve as in claim 3, in which the diameter of the housing bore is such as to produce an effective pressure receiving surface on the first end face area (A1) which is about equal to a counterpressure area (A3) which the piston has in the fourth chamber.

5. A control valve as in claim 3, further comprising means for exerting an additional force (F5) on the piston.

6. A control valve as in claim 5, in which the means for exerting an additional force comprises a spring which is mounted to apply the additional force on one of the first and second end face areas of the piston.

7. A control valve as in claim 5, in which the means for exerting an additional force comprises a fifth pressure chamber and means for introducing into the fifth pressure chamber a fluid under pressure which is effective for producing the additional force.

8. A control valve as in claim 1, in which the first overflow gap is formed by a control edge which is defined between the piston and the housing, the control edge being located at the second end face area which is subjected to the second pressure ($p_2$).

9. A control valve as in claim 8, further comprising means for adjusting the size of the second end face area (A2) of the piston and the size of the first overflow gap.

10. A control valve as in claim 9, in which the means for adjusting the size of the second end face area and the size of the first overflow gap includes first parts associated with the housing and second parts associated with the piston, the first parts and the second parts being replaceable with corresponding parts which define a differently sized first overflow gap.

11. A control valve as in claim 9, in which the means for adjusting the size of the first overflow gap comprises a washer.

12. A control valve as in claim 1, including a separation partition disposed between and separating the third and fourth chambers from one another.

13. A control valve as in claim 12, in which the piston includes a piston part which connects the first and second end face areas, the piston part having a diameter (Do) which is about equal to the diameter of the second end face area (A2), the piston part extending through a bore formed in the partition.

14. A control valve as in claim 1, in which the first end face area which is subjected to the first pressure ($p_1$) contains a tapering surface which tapers toward the fourth chamber at a taper ratio of between 1:200 and 1:500.

15. A control valve as in claim 1, in combination with a press roll, the press roll including:
   an adjustable deflection roll and a yoke associated with the adjustable deflection roll, the control valve being attached to the yoke such that the first pressure chamber of the control valve communicates to a roll pressure chamber in the press roll in which there prevails a pressure which equals a contact pressure which is exerted by the yoke on a roll shell of the press roll.

16. A control valve as in claim 1, further in combination with a press roll, the control valve being coupled to the press roll and the press roll including:
   hydraulic cylinders for generating fluid at a pressure equal to said second pressure ($p_2$) and means for coupling the fluid at said second pressure ($p_2$) to the second pressure chamber of the control valve; and
   a first roll (153) and a counter roll (54), the first roll being pressed against the counter roll by pressure exerted from the hydraulic cylinders.

17. A control valve comprising:
   a control valve housing defining a first chamber for holding fluid at the first pressure ($p_1$), a second chamber for holding fluid at the second pressure ($p_2$), a third, low-pressure, chamber having an ambient pressure which is lower than the second pressure ($p_2$);
   a piston movable in the housing and having a first end face area (A1) which is exposed to the first pressure in the first chamber and a second end face area (A2) which is exposed to the second pressure in the second pressure chamber;
   an overflow gap extending between the second chamber and the third, low-pressure, chamber, the overflow gap having a fluid passage size which is controlled by the position of the piston relative to the housing such that fluid flows from the second chamber to the third, low-pressure, chamber at a rate which maintains the pressure ratio at the predetermined ratio value; and
   an additional overflow gap between the first chamber and the third, low-pressure, chamber, the additional overflow gap being effective to connect the first pressure chamber to the third, low-pressure, chamber whenever the second pressure falls below a predetermined pressure value.

18. A control valve as in claim 17, further including a guide bushing disposed between the housing and the piston for guiding the piston in the housing.

19. A control valve as in claim 18, in which the guide bushing is a ball guide bushing.

* * * * *